United States Patent [15] 3,664,208
Saito [45] May 23, 1972

[54] APPARATUS FOR ADJUSTING THE POSITION OF THE AXIS OF A BELT SUPPORTING PULLEY

[72] Inventor: Noboru Saito, Tokyo, Japan
[73] Assignee: Nitto Kohki Company Limited, Tokyo, Japan
[22] Filed: Jan. 27, 1971
[21] Appl. No.: 110,096

[30] Foreign Application Priority Data

Dec. 10, 1970 Japan.................................45/35657

[52] U.S. Cl.......................74/242.15, 51/135 R, 51/170 EB
[51] Int. Cl..........................................................F16h 7/10
[58] Field of Search..............74/242, 242.15; 51/135 R, 147, 51/170 EB

[56] References Cited

UNITED STATES PATENTS

| 1,821,624 | 9/1931 | Emmons | 51/135 R |
| 2,232,149 | 2/1941 | Tautz | 51/147 |
| 3,496,679 | 2/1970 | Dunn | 51/135 R |

*Primary Examiner*—C. J. Husar
*Attorney*—Flynn & Frishauf

[57] ABSTRACT

An apparatus for adjusting the tension of an endless belt and correcting for parallelism of the drive and idler pulleys in an endless belt system such as a belt grinder. The idler pulley is mounted on the arm of a block provided with a slot which can be opened or closed thereby, altering the axial position of the idler, relative to the drive pulley.

5 Claims, 3 Drawing Figures

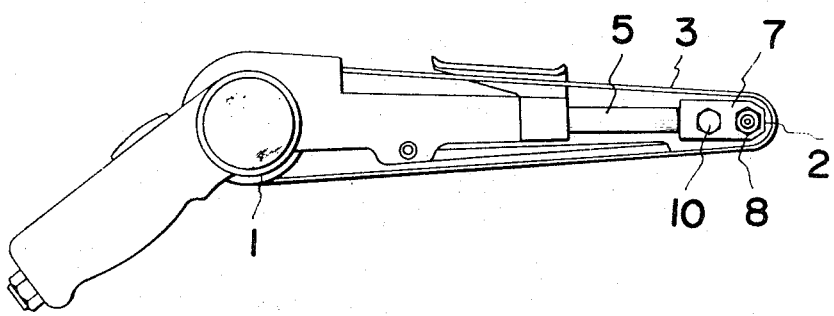
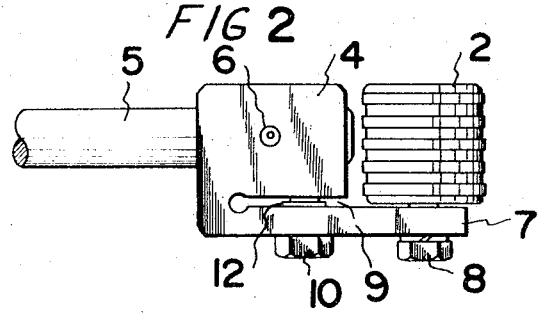
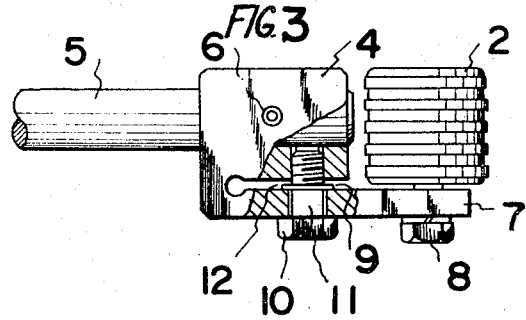

APPARATUS FOR ADJUSTING THE POSITION OF THE AXIS OF A BELT SUPPORTING PULLEY

This invention relates to an apparatus for adjusting the position of the axis of a belt supporting pulley over which an endless belt is passing, relative to the axis of a drive pulley and the direction of movement of the belt. The device is particularly suitable to adjust the position of the idler pulley in a belt grinder tool.

In endless belt devices, particularly high speed belt grinding devices belt slippage is a major problem and despite careful initial tensioning of the belt between the drive and idler pulleys slippage can develop during operations due to stretching of the cloth or paper grinding belt. As the stretching may not be uniform, a lack of parallelism between the axes of the pulleys may develop.

It is therefore an object of the present invention to overcome the disadvantages of the prior art and to provide a means for adjusting the axis of the idler pulley in a relatively high speed endless belt device, such as an endless belt grinding tool, while the tool is in operation, whereby the tension may be compensated or parallelism improved. According to summary of the invention one aspect of the invention there is provided, in an endless belt apparatus in which a tensioned endless belt passes over a drive pulley and an idler pulley, a resilient supporter block mounted on a belt tensioning means and having an integrally formed elongated arm which defines an open ended slot between the block and the arm. The idler pulley is rotatably mounted on the arm adjacent to and substantially perpendicular to the open end of the slot; and a means is provided on the block to open and close the open end of the slot so that the axis of the idler pulley can be adjusted relative to the axis of the drive pulley and the direction of movement of the belt.

Hereinafter, the present invention is described with respect to an embodiment thereof wherein the novel apparatus of the present invention is attached to a portable belt grinding tool, references being made to the accompanying drawings in which:

FIG. 1 is a side-sectional view of a belt grinding tool equipped with the novel apparatus of the present invention;

FIG. 2 is a plan view of the novel apparatus of the present invention; and

FIG. 3 is a partial sectional plan view thereof.

In the drawing, FIG. 1 illustrates a portable belt grinding tool in which a grinding belt 3 is tensioned between a driving wheel 1 and a belt pulley 2, the grinding belt being driven at a relatively high velocity to carry out a grinding operation. The belt pulley 2, as shown in FIGS. 2 and 3, is rotatably and axially screwed to one end of an elongated arm segment 7 of a supporter 4 which is firmly fixed to an intermediate rod 5 by pin 6. A slot 9, whose width and length are not limited, is provided at the base of the arm segment 7 of the supporter 4 along the arm segment. In addition, a means to open and close the slot is provided. For instance, a bolt 11 having a head 10 is so screwed as to intersect with the slot at right angles from the outer direction of the arm 7. A snap ring 12 may be inserted in a position adjacent the inner side of arm 7 and in the slot 9, so as to secure the bolt in the arm 7. The supporter 4 is preferably made of a resilient or elastic material such as steel or synthetic resin.

In operation, as bolt 11 is screwed in and out the open end of slot 9 is closed or opened, as the elastic arm 7 moves toward or away from body 4, thereby altering the axial position of the idler pulley 2, relative to the axis of the drive pulley 1. Thus the belt 3 can be adjusted within close limits to eliminate slip or to compensate for a lack of parallelism of the pulleys.

While the present invention has been described with particular reference to belt grinding tools, the simple structure and adjustment device finds many other applications in the field of endless belt systems.

The embodiments of the invention in which an exclusive property or privilege is claimed are defined as follows:

1. In an endless belt apparatus in which a tensioned endless belt passes over a drive pulley and an idler pulley, the improvement comprising: a resilient supporter block mounted on a belt tensioning means, and having an integrally formed elongated arm, said arm and said block defining an open ended slot therebetween, said idler pulley being rotatably mounted on said arm adjacent and substantially perpendicular to the open end of said slot; and means coupled to said block to open and close said open ended slot for adjusting the tension and angulation of said belt.

2. An endless belt apparatus as claimed in claim 1 wherein said apparatus is a belt grinding tool.

3. An apparatus as claimed in claim 1 wherein said means to open and close said slot comprises a headed bolt passing through said arm at substantially a right angle thereto and screwed into said block.

4. An apparatus as claimed in claim 3 including a snap ring on said bolt adjacent said arm in said slot for preventing withdrawal of said bolt from said arm.

5. An apparatus as claimed in claim 1 wherein said block is a steel block.

6. An apparatus as claimed in claim 1 wherein said block is a synthetic resin block.

* * * * *